(12) United States Patent
Pavetic et al.

(10) Patent No.: US 10,904,586 B2
(45) Date of Patent: Jan. 26, 2021

(54) METHODS, SYSTEMS, AND MEDIA FOR DETECTING AND TRANSFORMING ROTATED VIDEO CONTENT ITEMS

(71) Applicant: Google LLC, Mountain View, CA (US)

(72) Inventors: Filip Pavetic, Zurich (CH); Hanna Pasula, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/615,366

(22) PCT Filed: Dec. 13, 2017

(86) PCT No.: PCT/US2017/066116
§ 371 (c)(1),
(2) Date: Nov. 20, 2019

(87) PCT Pub. No.: WO2019/117892
PCT Pub. Date: Jun. 20, 2019

(65) Prior Publication Data
US 2020/0162770 A1 May 21, 2020

(51) Int. Cl.
*H04N 21/234* (2011.01)
*G06F 16/783* (2019.01)
*G06F 21/10* (2013.01)

(52) U.S. Cl.
CPC ... *H04N 21/23418* (2013.01); *G06F 16/7837* (2019.01); *G06F 21/10* (2013.01)

(58) Field of Classification Search
CPC .......... H04N 21/23418; G06F 16/7837; G06F 21/10
See application file for complete search history.

(56) References Cited

U.S. PATENT DOCUMENTS 8,731,335 B2  5/2014  Zheng et al.
8,989,376 B2  3/2015  Ren et al.
(Continued)

OTHER PUBLICATIONS

International Search Report and Written Opinion dated Aug. 6, 2018 in International Patent Application No. PCT/US2017/066116.

*Primary Examiner* — Yassin Alata
(74) *Attorney, Agent, or Firm* — Byrne Poh LLP (57) ABSTRACT

Methods, systems, and media for detecting and transforming rotated video content items are provided. The method comprises: receiving a video having a plurality of frames, wherein the video is associated with a first fingerprint; determining a rotation value associated with at least a portion of the plurality of frames to obtain a plurality of rotation values; determining an overall rotation value associated with the video based on a portion of the plurality of rotation values; determining whether at least one additional fingerprint of the video should be generated based on the overall rotation value; in response to determining that the at least one additional fingerprint of the video should be generated based on the overall rotation value, selecting a rotation transform based on the overall rotation value that rotates the plurality of frames of the video to an initial rotation position; applying the rotation transform to at least a portion of the plurality of frames of the video; generating a second fingerprint that represents the transformed video; and comparing the second fingerprint of the transformed video to a plurality of fingerprints associated with reference videos to determine whether the video corresponding to the transformed video matches one of the reference videos.

21 Claims, 5 Drawing Sheets

(56) References Cited

U.S. PATENT DOCUMENTS

| | | | |
|---|---|---|---|
| 2009/0030651 A1* | 1/2009 | Wold | G06F 16/785 |
| | | | 702/179 |
| 2012/0213438 A1* | 8/2012 | Quan | G06K 9/00744 |
| | | | 382/170 |

* cited by examiner

METHODS, SYSTEMS, AND MEDIA FOR DETECTING AND TRANSFORMING ROTATED VIDEO CONTENT ITEMS

TECHNICAL FIELD

The disclosed subject matter relates to methods, systems, and media for detecting and transforming rotated video content items. More particularly, the disclosed subject matter relates to determining whether a video content item has been rotated based on a rotation detection performed on the frames of the video content item and determining whether to generating an additional fingerprint representation of a transformed version of the video content item.

BACKGROUND

Video content providers can receive uploaded video content, store the uploaded video content, and then provide the uploaded video content to many users, for example, by streaming the video content to multiple user devices. These video content providers may determine whether the uploaded video content matches video content in a reference database, for example, that includes reference files of copyrighted content.

However, it is often difficult to determine whether uploaded video content matches a reference file of copyrighted content. For example, video content providers have begun to receive uploaded video content containing content in which some of the frames of the video content have been rotated (e.g., by 90 degrees). In a more particular example, uploaders of the video content may be circumventing the detection systems of the video content providers by rotating the video content in such as a way that it remains viewable on a device that is capable of being physically rotated to accommodate the rotated video content, such as a tablet computing device or a mobile communications device. It is difficult to determine whether such rotated video content matches the video content stored in a reference file.

Accordingly, it is desirable to provide methods, systems, and media for detecting and transforming rotated video content items.

SUMMARY

Methods, systems, and media for detecting and transforming rotated video content items are provided.

In accordance with some embodiments of the disclosed subject matter, a computer-implemented method for detecting unauthorized media content items is provided, the method comprising: receiving, using a hardware processor, a video having a plurality of frames, wherein the video is associated with a first fingerprint; determining, using the hardware processor, a rotation value associated with at least a portion of the plurality of frames to obtain a plurality of rotation values; determining, using the hardware processor, an overall rotation value associated with the video based on a portion of the plurality of rotation values; determining, using the hardware processor, whether at least one additional fingerprint of the video should be generated based on the overall rotation value; in response to determining that the at least one additional fingerprint of the video should be generated based on the overall rotation value, selecting, using the hardware processor, a rotation transform based on the overall rotation value that rotates the plurality of frames of the video to an initial rotation position; applying, using the hardware processor, the rotation transform to at least a portion of the plurality of frames of the video; generating, using the hardware processor, a second fingerprint that represents the transformed video; and comparing, using the hardware processor, the second fingerprint of the transformed video to a plurality of fingerprints associated with reference videos to determine whether the video corresponding to the transformed video matches one of the reference videos.

In some embodiments, each rotation value is associated with a confidence value, wherein the method further comprises selecting a subset of the plurality of rotation values based on the confidence value, and wherein the overall rotation value is determined based on the subset of the plurality of rotation values.

In some embodiments, the second fingerprint is generated in response to determining that the overall rotation value is orthogonal to the initial rotation position.

In some embodiments, the method further comprises inhibiting the second fingerprint from being generated in response to determining that the overall rotation value indicates that the received video is a vertically flipped version of an original video.

In some embodiments, the second fingerprint represents at least a portion of the transformed video.

In some embodiments, the method further comprises causing an indication of the match to be transmitted to a computing device in response to determining that the video corresponding to the transformed video matches one of the reference videos by at least a threshold amount.

In some embodiments, the method further comprises generating a plurality of additional fingerprints that each represent a feature of the transformed video.

In accordance with some embodiments of the disclosed subject matter, a system for detecting unauthorized media content items is provided, the system comprising a memory and a hardware processor that, when executing computer-executable instructions stored in the memory, is configured to: receive a video having a plurality of frames, wherein the video is associated with a first fingerprint; determine a rotation value associated with at least a portion of the plurality of frames to obtain a plurality of rotation values; determine an overall rotation value associated with the video based on a portion of the plurality of rotation values; determine whether at least one additional fingerprint of the video should be generated based on the overall rotation value; in response to determining that the at least one additional fingerprint of the video should be generated based on the overall rotation value, select a rotation transform based on the overall rotation value that rotates the plurality of frames of the video to an initial rotation position; apply the rotation transform to at least a portion of the plurality of frames of the video; generate a second fingerprint that represents the transformed video; and compare the second fingerprint of the transformed video to a plurality of fingerprints associated with reference videos to determine whether the video corresponding to the transformed video matches one of the reference videos.

In accordance with some embodiments of the disclosed subject matter, a non-transitory computer-readable medium containing computer-executable instructions that, when executed by a processor, cause the processor to perform a method for detecting unauthorized media content items is provided, the method comprising: receiving a video having a plurality of frames, wherein the video is associated with a first fingerprint; determining a rotation value associated with at least a portion of the plurality of frames to obtain a plurality of rotation values; determining an overall rotation value associated with the video based on a portion of the plurality of rotation values; determining whether at least one additional fingerprint of the video should be generated based on the overall rotation value; in response to determining that the at least one additional fingerprint of the video should be generated based on the overall rotation value, selecting a rotation transform based on the overall rotation value that rotates the plurality of frames of the video to an initial rotation position; applying the rotation transform to at least a portion of the plurality of frames of the video; generating a second fingerprint that represents the transformed video; and comparing the second fingerprint of the transformed video to a plurality of fingerprints associated with reference videos to determine whether the video corresponding to the transformed video matches one of the reference videos.

In accordance with some embodiments of the disclosed subject matter, a system for detecting unauthorized media content items is provided, the system comprising: means for receiving a video having a plurality of frames, wherein the video is associated with a first fingerprint; means for determining a rotation value associated with at least a portion of the plurality of frames to obtain a plurality of rotation values; means for determining an overall rotation value associated with the video based on a portion of the plurality of rotation values; means for determining whether at least one additional fingerprint of the video should be generated based on the overall rotation value; in response to determining that the at least one additional fingerprint of the video should be generated based on the overall rotation value, means for selecting a rotation transform based on the overall rotation value that rotates the plurality of frames of the video to an initial rotation position; means for applying the rotation transform to at least a portion of the plurality of frames of the video; means for generating a second fingerprint that represents the transformed video; and means for comparing the second fingerprint of the transformed video to a plurality of fingerprints associated with reference videos to determine whether the video corresponding to the transformed video matches one of the reference videos.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for detecting and transforming rotated video content items are provided.

In some embodiments, the mechanisms described herein can receive a video content item and determine a likelihood that the video content item includes content that has been rotated. This can include, for example, determining a rotation value for each frame of the video content item in relation to an initial rotation position (e.g., a 0 degree rotation). In a more particular example, this can include applying a rotation classifier that determine whether a frame of the video content item falls within one class of multiple classes, where each class represents a particular rotation (e.g., a 0 degree rotation, a 90 degree rotation, a 180 degree rotation, a 270 degree rotation, or any other suitable rotation). In continuing this example, the mechanisms can determine an overall rotation value of the video content item based on one or more of the rotation values that are output from the rotation classifier for the frames of the video content item.

It should be noted that, in some embodiments, the mechanisms can determine a confidence value associated with each rotation value. The confidence value can, for example, represent a confidence level or probability that the rotation classifier has determined the correct rotation value for a frame. For example, the rotation classifier can output a probability that a particular frame of a video content item belongs in a particular rotation class (e.g., a 90% probability that the particular frame has been rotated by 270 degrees). In continuing this example, based on the confidence value (e.g., being greater than a particular confidence threshold), the mechanisms can determine which of the determined rotation values to associate and store with the video content item. In another example, the mechanisms can associate and store a particular number of rotation values based on the rotation values having the highest confidence values (e.g., top ten rotation values based on confidence value). Alternatively, in some embodiments, the mechanisms can use each of the rotation values from the rotation classifier to determine the overall rotation value associated with the video content item.

In some embodiments, the mechanisms can determine whether an additional fingerprint of the video content item should be generated based on the overall rotation value. For example, in response to determining that the video content item has been rotated to a particular rotation angle (e.g., a 90 degree rotation or a 270 degree rotation), the mechanisms can select a rotation transform based on the overall rotation value and generate a transformed video content item. It should be noted that one or more fingerprinted or other suitable compact representations, such as a video fingerprint, an audio fingerprint, and/or a melody fingerprint of a portion of the transformed video content item, can be generated, thereby obtaining one or more additional fingerprints of the transformed video content item.

In some embodiments, the mechanisms can compare the additional fingerprints with fingerprints of stored video content items, such as fingerprints associated with reference files in a reference database, to determine whether a match exists. For example, in response to determining that the transformed fingerprint matches at a least a threshold amount of a fingerprint of a stored video content item, the mechanisms can perform an action in connection with the video content item.

In some embodiments, the mechanisms described herein can be used to detect particular types of video content in an uploaded video content item. For example, in some embodiments, the mechanisms can be used to detect potentially copyrighted video content or potentially copyrighted audio content within the uploaded video content item. It should be noted that various fingerprinting techniques have been used to identify copyrighted content, for example, by matching a portion of a content item to a reference content item in a database of reference content items. However, these fingerprinting techniques are sometimes unable to identify copyrighted video content when an uploaded video content item is a modified version of the copyrighted video content item. For example, in instances where the uploaded video content item includes a video content item that has been modified to be rotated by a particular number of degrees, the fingerprinting techniques may be unable to detect a match to video content in the reference database.

These mechanisms can, for example, allow a content server to continuously detect the application of new forms of circumvention techniques (e.g., different rotation angles) that may not have been used at the time the media content item was uploaded to the content server. In another example, these mechanisms can allow the content server to identify user accounts that have uploaded multiple media content items that have been modified with a circumvention technique.

Figure 1:
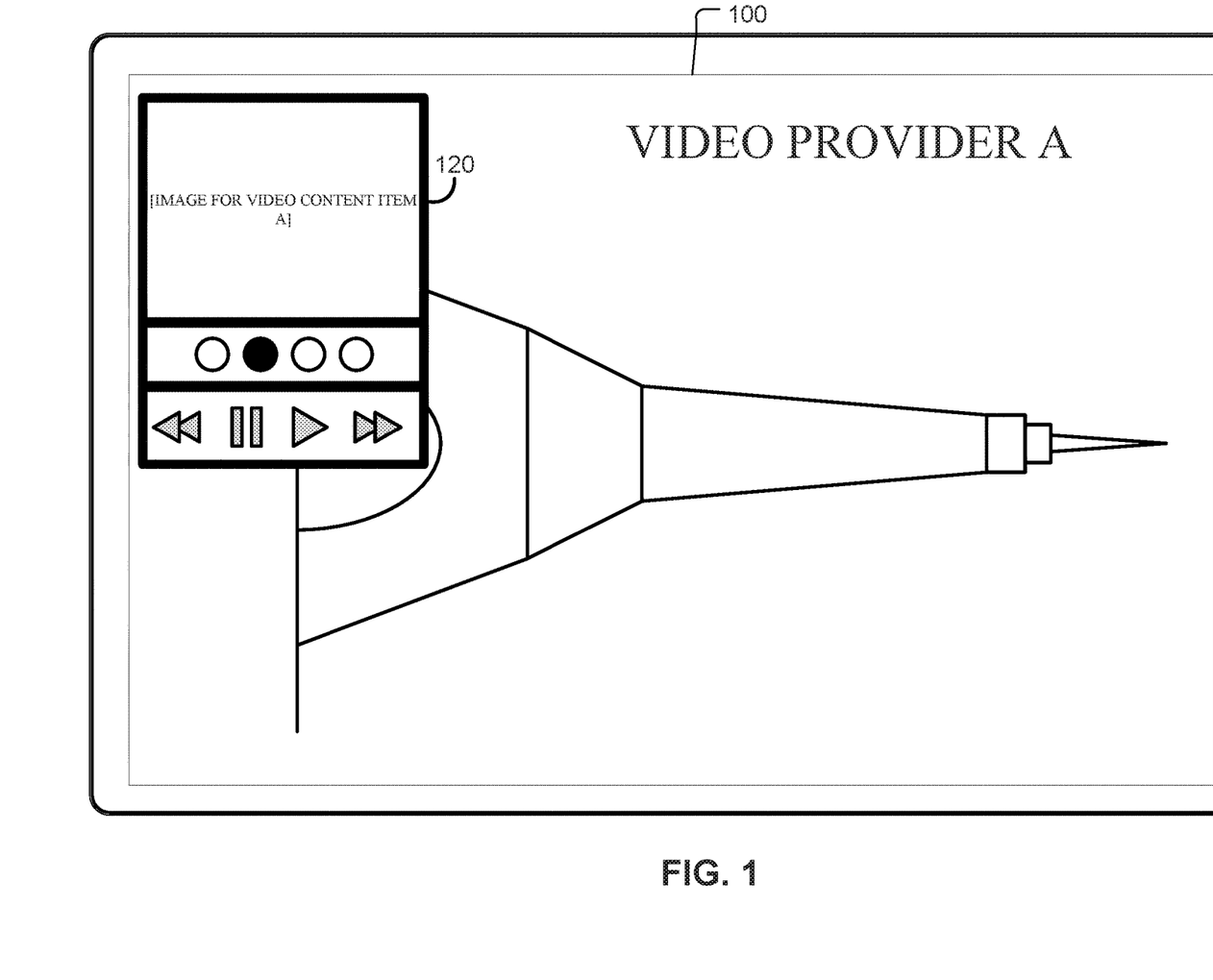
FIG. 1 shows an illustrative example of a rotated video content item being presented on a user device in accordance with some embodiments of the disclosed subject matter.

Turning to FIG. 1, an illustrative example of a user interface in which a video content item is being presented, where a rotation circumvention technique may have been applied to the video content item, is shown in accordance with some embodiments of the disclosed subject matter. As illustrated, user interface can include video content 100 that has been rotated by a particular number of degrees (e.g., about a 90 degree rotation orientation in relation to the viewport) in comparison with the video window and the control portions 110 of the video window (e.g., at about a 0 degree rotation orientation in relation to the viewport), such as a media tile that identifies the video content item, a playlist indicator that indicates the position of the video content item within a playlist of video content items, and control options for controlling the playback of the video content item.

Figure 2:
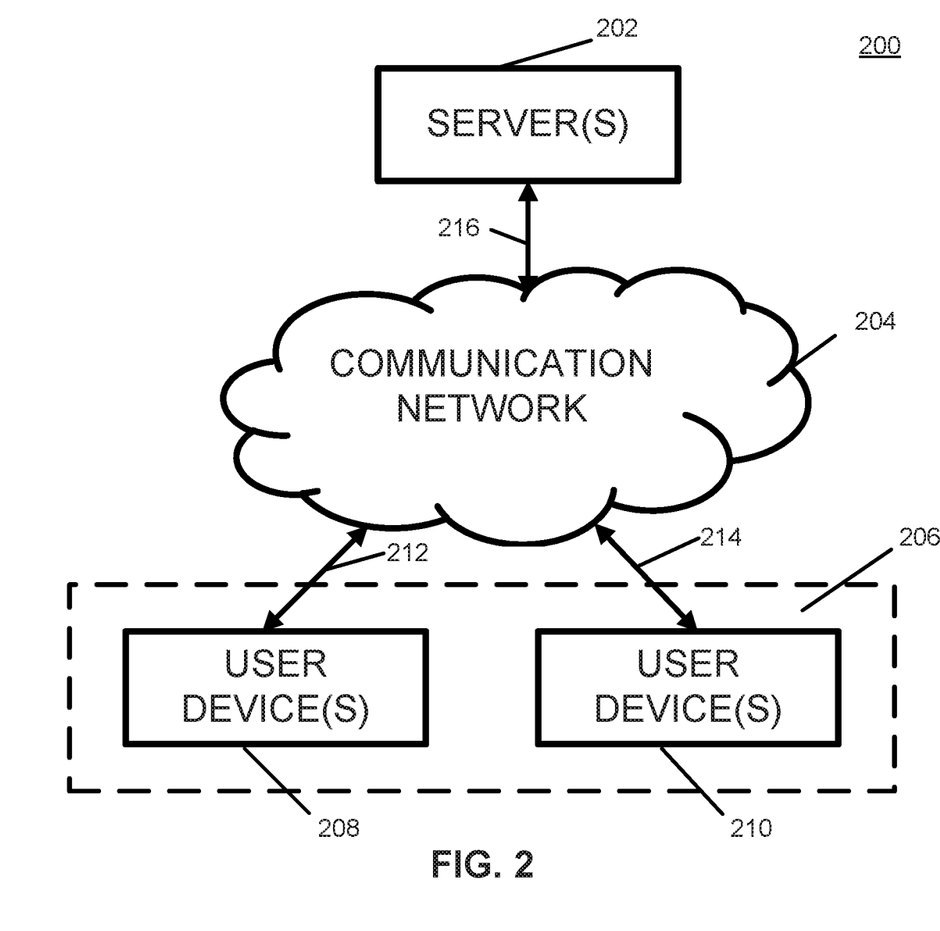
FIG. 2 shows a schematic diagram of an illustrative system suitable for implementation of mechanisms described herein for detecting and transforming rotated video content items in accordance with some embodiments of the disclosed subject matter.

Turning to FIG. 2, an example of an illustrative system 300 suitable for implementation of mechanisms described herein for detecting and transforming rotated video content item is shown in accordance with some embodiments of the disclosed subject matter is shown. As illustrated, hardware 200 can include one or more servers, such as a server 202, a communication network 204, and/or one or more user devices 206, such as user devices 208 and 210.

In some embodiments, server(s) 202 can be any suitable server(s) for receiving a video content item, applying a rotation classifier to frames of the video content item to determine a rotation value, determine a confidence value associated with each of the rotation values, select and/or store a subset of the rotation values for the video content item based on the confidence values, determine an overall rotation value based on the subset of rotation values associated with the video content item, determine whether to generate one or more additional fingerprints of the video content item based on the overall rotation value, select and apply a rotation transform to the video content item in response to determining that one or more additional fingerprints of the video content item should be generated, generating one or more additional fingerprints that represent at least a portion of the transformed video content item, determining whether the one or more additional fingerprints match a reference video content item, and/or performing any other suitable functions. For example, as described below in connection with FIGS. 4 and 5, server(s) 202 can associate, with a video content item, one or more additional fingerprints that represent at least a portion of the transformed video content item in which a rotation transform was applied. As a more particular example, in some embodiments, at particular intervals (e.g., once a day, once a week, etc.), server(s) 202 can execute a query to determine whether the one or more additional fingerprints that represent transformed media content items match reference video content items. As a more particular example, in some embodiments, server(s) 202 can generate fingerprints of the entire video content item as well as portions of the video content item (e.g., the audio portion of the video content item, the melody of the video content item, the opening introduction of the video content item, etc.). In some embodiments, server(s) 202 can be omitted.

Communication network 204 can be any suitable combination of one or more wired and/or wireless networks in some embodiments. For example, communication network 306 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 206 can be connected by one or more communications links 212 and/or 214 to communication network 204 that can be linked via one or more communications links (e.g., communications link 216) to server(s) 202. Communications links 212, 214, and/or 216 can be any communications links suitable for communicating data among user devices 306 and server(s) 202 such as network links, dial-up links, wireless links, hard-wired links, any other suitable communications links, or any suitable combination of such links.

In some embodiments, user devices 206 can include one or more computing devices suitable for transmitting a video content item to server(s) 202, transmitting information related to the video content item to server(s) 202, and/or any other suitable functions. For example, in some embodiments, user devices 206 can be implemented as a mobile device, such as a smartphone, mobile phone, a tablet computer, a laptop computer, a vehicle (e.g., a car, a boat, an airplane, or any other suitable vehicle) entertainment system, a portable media player, and/or any other suitable mobile device. As another example, in some embodiments, user devices 306 can be implemented as a non-mobile device such as a desktop computer, a set-top box, a television, a streaming media player, a game console, and/or any other suitable non-mobile device.

Although server 202 is illustrated as a single device, the functions performed by server 202 can be performed using any suitable number of devices in some embodiments. For example, in some embodiments, multiple devices can be used to implement the functions performed by server 202. In a more particular example, a first server can be used to store video content items, a second server can be used to determine a rotation value associated with frames of the video content items with one or more rotation classifiers, a third server can be used to determine whether one or more additional fingerprints of a video content item should be generated based on rotation values associated with the video content item, a fourth server can be used to generate a transformed video content item by applying a rotation transform and generate one or more additional fingerprints of the transformed video content item, a fifth server can be used to determine whether a transformed fingerprint matches a reference video content item, and/or a sixth server can be used take action in response to determining that a transformed fingerprint associated with a transformed video content item matches a reference video content item (e.g., flag a user account, flag a channel or media source in which the transformed video content item was uploaded, remove the video content item such that other users of the content server are inhibited from consuming the video content item, etc.).

Although two user devices 208 and 210 are shown in FIG. 2, any suitable number of user devices, and/or any suitable types of user devices, can be used in some embodiments.

Server(s) 202 and user devices 206 can be implemented using any suitable hardware in some embodiments. For example, in some embodiments, devices 202 and 206 can be implemented using any suitable general purpose computer or special purpose computer. For example, a server may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, message interface(s) 314, an antenna 316, and a bus 318.

Figure 3:
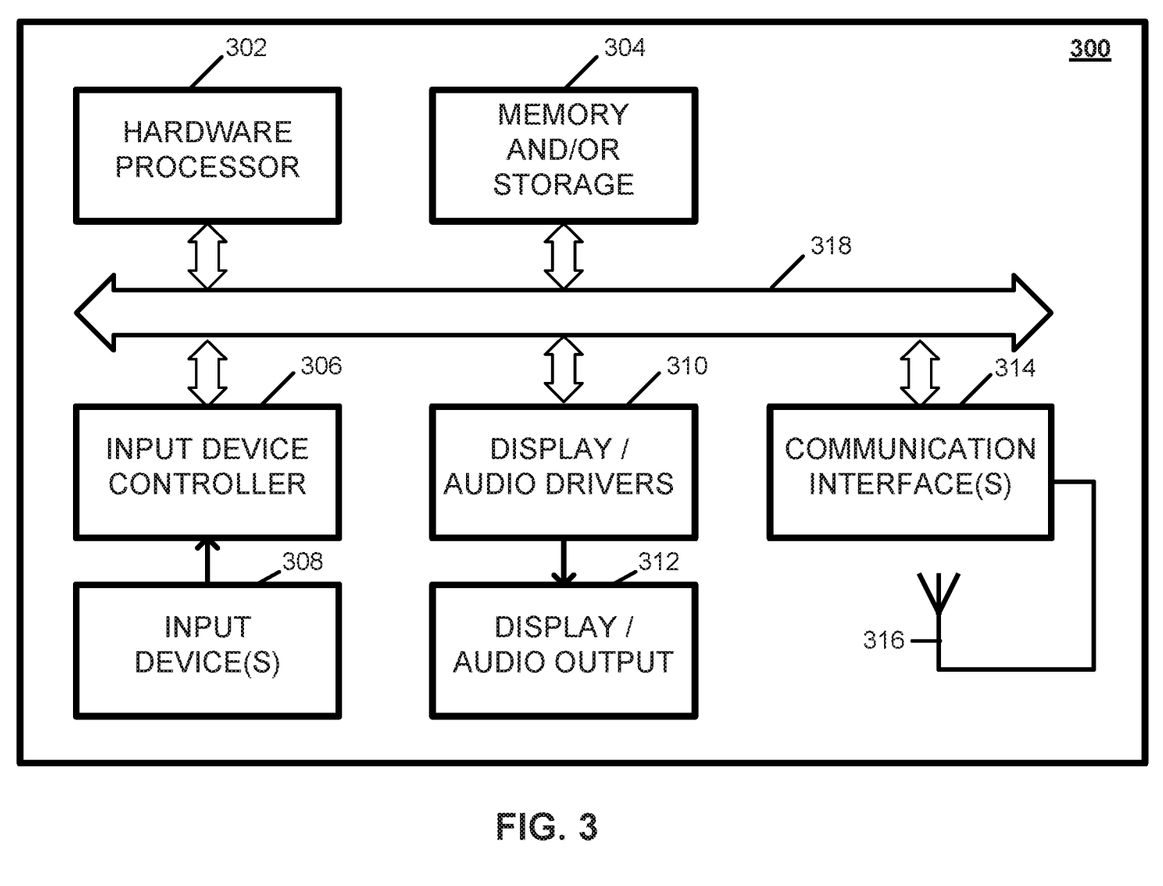
FIG. 3 shows a detailed example of hardware that can be used in a server and/or a user device of FIG. 2 in accordance with some embodiments of the disclosed subject matter.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 302 can be controlled by a server program stored in memory and/or storage 304 of a server (e.g., such as server 202). For example, the server program can cause hardware processor 302 to determine a rotation value associated with frames of the video content items with one or more rotation classifiers, determine whether one or more additional fingerprints of a video content item should be generated based on rotation values associated with the video content item, generate a transformed video content item by applying a rotation transform and generate one or more additional fingerprints of the transformed video content item, determine whether a transformed fingerprint matches a reference video content item, and/or take an action in response to determining that a transformed fingerprint associated with a transformed video content item matches a reference video content item (e.g., flag a user account, flag a channel or media source in which the transformed video content item was uploaded, remove the video content item such that other users of the content server are inhibited from consuming the video content item, etc.), and/or perform any other suitable actions. In some embodiments, hardware processor 302 can be controlled by a computer program stored in memory and/or storage 304 of user device 206. For example, the computer program can cause hardware processor 302 to transmit a video content item to server(s) 202, and/or perform any other suitable actions.

Memory and/or storage 304 can be any suitable memory and/or storage for storing programs, data, media content, advertisements, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 406 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device. In another example, input device controller 406 can be circuitry for receiving input from a head-mountable device (e.g., for presenting virtual reality content or augmented reality content).

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks, such as network 204 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 204) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

Figure 4:
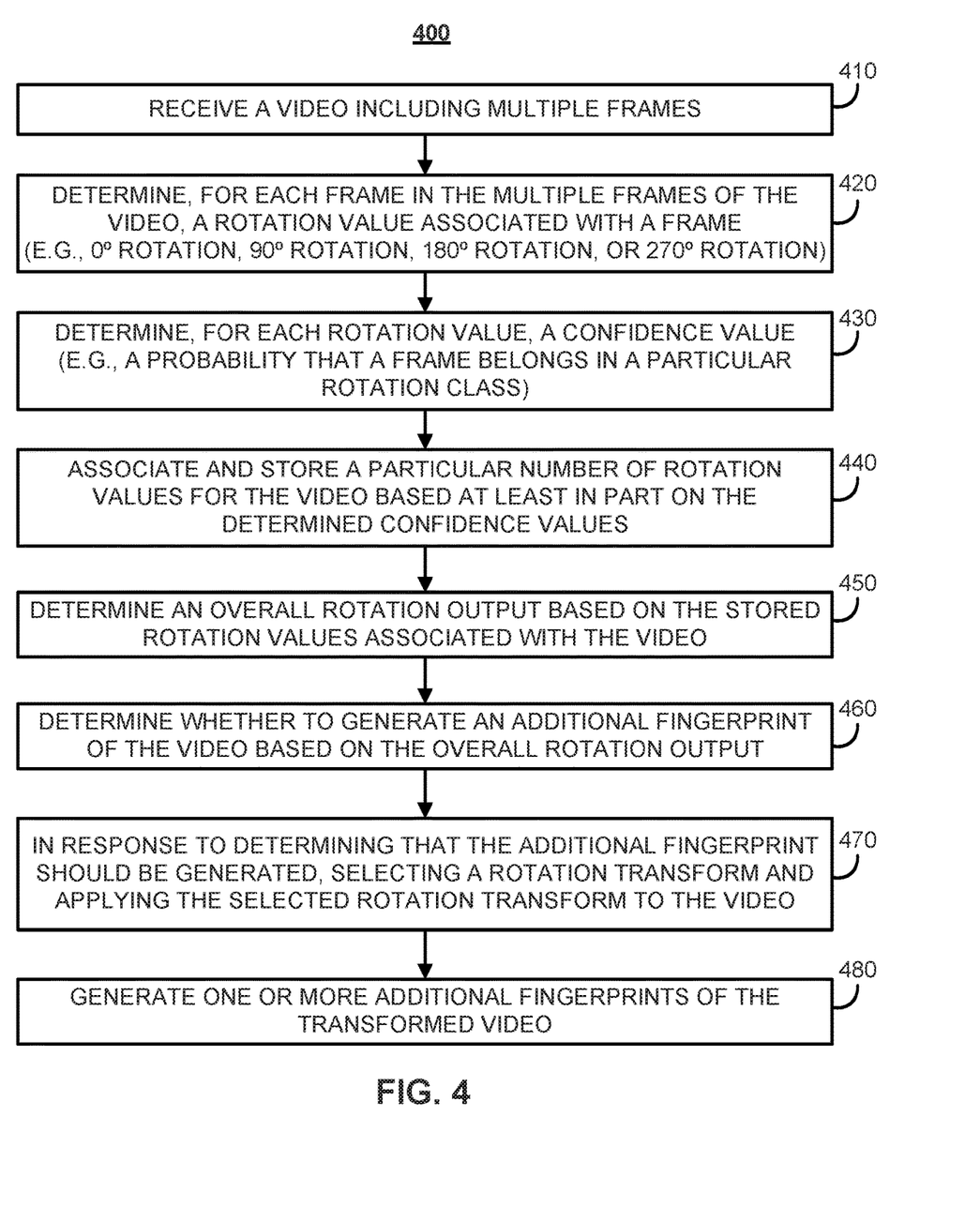
FIG. 4 shows an illustrative example of a process for detecting and transforming rotated video content items in accordance with some embodiments of the disclosed subject matter.

Turning to FIG. 4, an illustrative example 400 of a process for generating and executing one or more query-transforms in connection with video content items is shown in accordance with some embodiments of the disclosed subject matter. In some embodiments, blocks of process 500 can be executed on server(s) 302.

FIG. 4 shows an illustrative example of a process for detecting and transforming rotated video content items in accordance with some embodiments of the disclosed subject matter.

Process 400 can begin by receiving a video content item that includes multiple frames at 410. For example, process 400 can access an uploaded video content item that is stored on a content server, where the video content item has one or more associated fingerprints that represent the video content item. In another example, process 400 can select particular video content items that meet a particular criterion (e.g., upload date, view count, etc.). In yet another example, process 400 can receive a video content item that has been uploaded by a user having a user account.

In some embodiments, process 400 can receive abuse criteria associated with a detection circumvention technique that may have been applied to one or more video content items along with an exemplary video content item (e.g., a link to a video content item in which the circumvention technique may have been applied). The received abuse criteria can include one or more terms that describe a circumvention technique that may have been applied to one or more video content items, such as a particular angle that a video content item was rotated at a particular time within the video content item. For example, process 400 can present a user interface that prompts a user to input abuse criteria associated with a circumvention technique that has been observed by the user.

In some embodiments, at 420, process 400 can determine, for each frame in the multiple frames of the video content item, a rotation value or rotation prediction associated with a frame. For example, process 400 can apply each frame of a video content item to a rotation classifier that is trained to classify image information as being likely of belonging in one of multiple classes, where each class represents a particular number of degrees of rotation. In a more particular example, the trained rotation classifier can be used to predict whether an input video frame has been rotated by a multiple of 90 degrees—e.g., 0 degrees, 90 degrees, 180 degrees, or 270 degrees.

It should be noted that a rotation value can be determined for any suitable number of frames of a video content item. For example, in some embodiments, process 400 can provide each frame of a video content item as an input to the rotation classifier and can obtain a rotation value for each frame of the video content item. In another example, in some embodiments, process 400 can select particular frames at any suitable interval or at different intervals. In a more particular example, process 400 can extract a frame from a video content item at two second intervals for the first thirty seconds of the video content item and extract a frame from the video content item at five second intervals for the remainder of the video content item. In another more particular example, process 400 can extract a frame from a video content item at a particular interval based on the overall length of the video content item (e.g., one frame every ten seconds if the video content item is greater than ten minutes in length).

In some embodiments, at 430, process 400 can also use a determined probability associated with each rotation value as a confidence value or indication of confidence. For example, at 420, the rotation classifier can generate an output indicating that it is 90% likely that a particular frame of a video content item has not been rotated and, accordingly, belongs in the 0 degrees rotation class. In another example, at 420, the rotation classifier can generate an output indicating that it is 10% likely that a particular frame of a video content item has been rotated by 270 degrees.

In some embodiments, at 440, process 400 can associate and store a particular number of rotation values for the video content item based at least part on the determined confidence values. In continuing the example above, process 400 can select a particular number of rotation values (e.g., ten rotation values or any other suitable number) in which each rotation value has a probability of belonging to a particular rotation class greater than a probability threshold (e.g., 80% probability of belonging to that rotation class). In another example, process 400 can continue to obtain rotation values or rotation predictions from different frames of a video content item until it has obtained a particular number of rotation predictions having a confidence or likelihood of belonging to a rotation class greater than a particular probability threshold.

In some embodiments, at 450, process 400 can determine an overall rotation output to associate with the video content item based on the stored rotation values. For example, process 400 can determine the most common rotation class from the stored rotation values and select that rotation class as the overall rotation output for the video content item (e.g., an overall rotation output of 90 degrees for the video content item). In another example, process 400 can weight each of the rotation values by its corresponding probability and determine the overall rotation output based on the weighted rotation values.

In some embodiments, at 460, process 400 can determine, based on the overall rotation output, whether an additional fingerprint of the video content item should be generated. For example, based on the predicted rotation of the video content item or a portion of the video content item and based on received video content item, process 400 can determine whether one or more additional fingerprints should be generated.

It should be noted that, in some embodiments, process 400 can determine that an additional fingerprint of the video content item should not be generated in response to the overall rotation output indicating that the video content item has been rotated by 0 degrees (not rotated) or 180 degrees (a flipped version of the video content item). For example, the video content item received at 410 can be associated with a flip-resistant fingerprint that was generated based on hash values associated with an uploaded version of the video content item and hash values associated with a vertically flipped version of the uploaded version of the video content item. This can, for example, reduce the number of additional fingerprints that are generated.

Referring back to FIG. 4, in response to determining that at least one additional fingerprint should be generated at 460, process 400 can select a rotation transform and apply the selected rotation transform to the uploaded version of the video content item received at 410. For example, in response to determining that the overall rotation output is 90 degrees or 270 degrees, process 400 can use a video editing application to select the appropriate rotation transform that returns the orientation of the uploaded version of the video content item to 0 degrees (not rotated). Upon applying the appropriate rotation transform, a transformed video content item can be obtained.

In some embodiments, at 480, process 400 can generate one or more fingerprint representations of the transformed video content item using any suitable fingerprinting technique (e.g., a video fingerprint, an audio fingerprint, a melody fingerprint, any suitable type of fingerprinting analysis, and/or any suitable combination thereof). In a more particular example, one fingerprint technique can include determining individual interest points that identify unique characteristics of local features of the time-frequency representation of the video content item. This can include, for example, identifying unique characteristics of a spectrogram associated with the video content item. An interest point can be defined as a spectral peak or spectral event of a specific frequency over a specific duration of time. In some embodiments, an interest point can also include timing of the onset of a note. One or more fingerprints can then be generated as functions of the sets of interest points.

It should be noted that a fingerprint of the transformed video content item can be generated to represent the entire transformed video content item or a portion of the video content item. For example, in response to determining that a portion of the video content item is rotated by a particular angle (e.g., 270 degrees), process 400 can select that portion of the video content item, transform the selected portion of the video content item, and generate one or more fingerprints that represent the transformed portion of the video content item.

In some embodiments, multiple fingerprints associated with a transformed video content item can be generated using multiple fingerprinting techniques. For example, a first fingerprint that represents a video portion of the video content item can be generated, a second fingerprint that represents a background audio portion of the video content item can be generated, a third fingerprint that represents a recurring song within the video content item can be generated, a fourth fingerprint that represents a speech portion of the video content item can be generated, and/or a fifth fingerprint that represents a video portion corresponding to the opening credits within the video content item can be generated.

Figure 5:
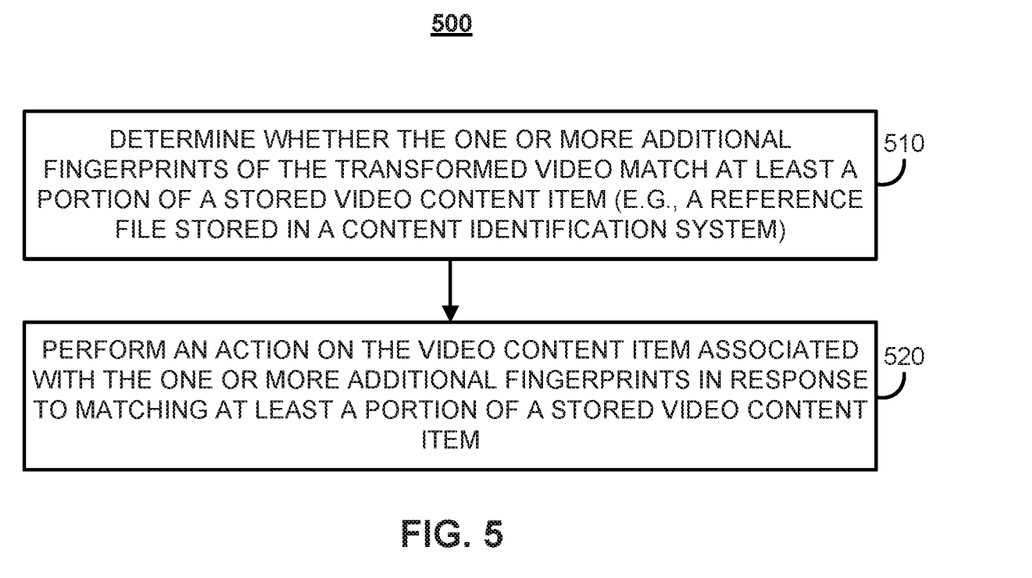
FIG. 5 shows an illustrative example of a process for using the fingerprint of a transformed video content item to detect the abusive or unauthorized upload of video content items in accordance with some embodiments of the disclosed subject matter.

FIG. 5 shows an illustrative example of a process for using the fingerprint of a transformed video content item to detect the abusive or unauthorized upload of video content items in accordance with some embodiments of the disclosed subject matter.

Turning to FIG. 5, in response to obtaining a fingerprint or other suitable compact representation of the transformed video content item, process 500 can determine whether the generated fingerprint matches a reference content item or any other portion of a stored content item at 510. For example, the one or more fingerprints generated to represent the transformed video content item can be compared with reference fingerprints of reference content items (e.g., a database of copyrighted videos, a database of copyrighted audio tracks, and/or any other suitable content items).

In some embodiments, at 520, in response to determining that the fingerprint or other suitable compact representation of the transformed video content item matches a reference content item (e.g., where at least a threshold amount of a fingerprint corresponding to the transformed video content item matches a reference fingerprint corresponding to a reference content item), process 500 can perform an action on the video content item corresponding to the transformed video content item.

For example, in some embodiments, in response to determining that the fingerprint or other suitable compact representation of the transformed video content item matches a reference content item, the video content item can be tagged and/or marked in any suitable manner. In a more particular example, in some embodiments, process 500 can tag an identifier of the video content item, thereby causing the video content item to be flagged for manual review to verify whether a circumvention technique was applied to the video content item (e.g., where the transformed video content item matches a particular copyrighted video content item). In some such embodiments, process 500 can include any other suitable information, such as a frame number corresponding to the flagged portion of the video content item, an identifier of the reference content item that produced a match to the video content item, and/or any other suitable information.

In some embodiments, process 500 can inhibit or block the video content item from being presented to other viewers as a circumvention technique was likely applied in which the video content item was rotated by a particular number of degrees and as it likely contains a copyrighted video content item. For example, process 500 can cause a warning message to be presented in place of the video content item. In another example, process 500 can modify the video content item (e.g., prevent movement to particular viewpoints, alter the video and/or audio content associated with the video content item, etc.).

In some embodiments, process 500 can determine a user account associated with a user that uploaded the video content item having the applied circumvention technique in which the video content item was rotated by a particular number of degrees. For example, process 500 can transmit a notification to the user account of the detected circumvention technique applied to the uploaded video content items. In another example, process 500 can inhibit or block video content items associated with the user account from being presented to other viewers.

Alternatively, in response to determining that the fingerprint or other suitable compact representation of the transformed video content item does not match a reference content item, the video content item can be tagged and/or marked in any suitable manner. For example, in some embodiments, process 500 can tag video content item with an identifier indicating that the video content item has been cleared for the particular abuse query and the particular transform.

In some embodiments, at least some of the above described blocks of the process of FIGS. 4 and 5 can be executed or performed in any order or sequence not limited to the order and sequence shown in and described in connection with the figure. Also, some of the above blocks of FIGS. 4 and 5 can be executed or performed substantially simultaneously where appropriate or in parallel to reduce latency and processing times. Additionally or alternatively, some of the above described blocks of the process of FIGS. 4 and 5 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personal information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for detecting and transforming rotated video content items are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A computer-implemented method for detecting unauthorized content items, the method comprising:
   receiving, using a hardware processor, a video having a plurality of frames, wherein the video is associated with a first fingerprint;
   determining, using the hardware processor, a rotation value associated with at least a portion of the plurality of frames to obtain a plurality of rotation values;
   determining, using the hardware processor, an overall rotation value associated with the video based on a portion of the plurality of rotation values;
   determining, using the hardware processor, whether at least one additional fingerprint of the video should be generated based on the overall rotation value;
   in response to determining that the at least one additional fingerprint of the video should be generated based on the overall rotation value, selecting, using the hardware processor, a rotation transform based on the overall rotation value that rotates the plurality of frames of the video to an initial rotation position;
   applying, using the hardware processor, the rotation transform to at least a portion of the plurality of frames of the video;
   generating, using the hardware processor, a second fingerprint that represents the transformed video; and
   comparing, using the hardware processor, the second fingerprint of the transformed video to a plurality of fingerprints associated with reference videos to determine whether the video corresponding to the transformed video matches one of the reference videos.

2. The computer-implemented method of claim 1, wherein each rotation value is associated with a confidence value, wherein the method further comprises:
   selecting a subset of the plurality of rotation values based on the confidence value, and wherein the overall rotation value is determined based on the subset of the plurality of rotation values.

3. The computer-implemented method of claim 1, wherein the second fingerprint is generated in response to determining that the overall rotation value is orthogonal to the initial rotation position.

4. The computer-implemented method of claim 1, further comprising inhibiting the second fingerprint from being generated in response to determining that the overall rotation value indicates that the received video is a vertically flipped version of an original video.

5. The computer-implemented method of claim 1, wherein the second fingerprint represents at least a portion of the transformed video.

6. The computer-implemented method of claim 1, further comprising causing an indication of the match to be transmitted to a computing device in response to determining that the video corresponding to the transformed video matches one of the reference videos by at least a threshold amount.

7. The computer-implemented method of claim 1, further comprising generating a plurality of additional fingerprints that each represent a feature of the transformed video.

8. A system for detecting unauthorized content items, the system comprising:
   a memory; and
   a hardware processor that, when executing computer-executable instructions stored in the memory, is configured to:
      receive a video having a plurality of frames, wherein the video is associated with a first fingerprint;
      determine a rotation value associated with at least a portion of the plurality of frames to obtain a plurality of rotation values;
      determine an overall rotation value associated with the video based on a portion of the plurality of rotation values;
      determine whether at least one additional fingerprint of the video should be generated based on the overall rotation value;
      in response to determining that the at least one additional fingerprint of the video should be generated based on the overall rotation value, select a rotation transform based on the overall rotation value that rotates the plurality of frames of the video to an initial rotation position;
      apply the rotation transform to at least a portion of the plurality of frames of the video;
      generate a second fingerprint that represents the transformed video; and
      compare the second fingerprint of the transformed video to a plurality of fingerprints associated with reference videos to determine whether the video corresponding to the transformed video matches one of the reference videos.

9. The system of claim 8, wherein each rotation value is associated with a confidence value, wherein the hardware processor is further configured to:
   select a subset of the plurality of rotation values based on the confidence value, and wherein the overall rotation value is determined based on the subset of the plurality of rotation values.

10. The system of claim 8, wherein the second fingerprint is generated in response to determining that the overall rotation value is orthogonal to the initial rotation position.

11. The system of claim 8, wherein the hardware processor is further configured to inhibit the second fingerprint from being generated in response to determining that the overall rotation value indicates that the received video is a vertically flipped version of an original video.

12. The system of claim 8, wherein the second fingerprint represents at least a portion of the transformed video.

13. The system of claim 8, wherein the hardware processor is further configured to cause an indication of the match to be transmitted to a computing device in response to determining that the video corresponding to the transformed video matches one of the reference videos by at least a threshold amount.

14. The system of claim 8, wherein the hardware processor is further configured to generate a plurality of additional fingerprints that each represent a feature of the transformed video.

15. A non-transitory computer-readable medium containing computer-executable instructions that, when executed by a processor, cause the processor to perform a method for detecting unauthorized content items, the method comprising:
   receiving a video having a plurality of frames, wherein the video is associated with a first fingerprint;
   determining a rotation value associated with at least a portion of the plurality of frames to obtain a plurality of rotation values;

determining an overall rotation value associated with the video based on a portion of the plurality of rotation values;

determining whether at least one additional fingerprint of the video should be generated based on the overall rotation value;

in response to determining that the at least one additional fingerprint of the video should be generated based on the overall rotation value, selecting a rotation transform based on the overall rotation value that rotates the plurality of frames of the video to an initial rotation position;

applying the rotation transform to at least a portion of the plurality of frames of the video;

generating a second fingerprint that represents the transformed video; and comparing the second fingerprint of the transformed video to a plurality of fingerprints associated with reference videos to determine whether the video corresponding to the transformed video matches one of the reference videos.

16. The non-transitory computer-readable medium of claim 15, wherein each rotation value is associated with a confidence value, and wherein the method further comprises:

selecting a subset of the plurality of rotation values based on the confidence value, and wherein the overall rotation value is determined based on the subset of the plurality of rotation values.

17. The non-transitory computer-readable medium of claim 15, wherein the second fingerprint is generated in response to determining that the overall rotation value is orthogonal to the initial rotation position.

18. The non-transitory computer-readable medium of claim 15, wherein the method further comprises inhibiting the second fingerprint from being generated in response to determining that the overall rotation value indicates that the received video is a vertically flipped version of an original video.

19. The non-transitory computer-readable medium of claim 15, wherein the second fingerprint represents at least a portion of the transformed video.

20. The non-transitory computer-readable medium of claim 15, wherein the method further comprises causing an indication of the match to be transmitted to a computing device in response to determining that the video corresponding to the transformed video matches one of the reference videos by at least a threshold amount.

21. The non-transitory computer-readable medium of claim 15, wherein the method further comprises generating a plurality of additional fingerprints that each represent a feature of the transformed video.

* * * * *